United States Patent [19]

Hanusa

[11] 4,139,187

[45] Feb. 13, 1979

[54] RESILIENT COMPOSITE FOAM CUSHION

[75] Inventor: Helmut G. Hanusa, Cape Girardeau, Mo.

[73] Assignee: Textron, Inc., Providence, R.I.

[21] Appl. No.: 741,242

[22] Filed: Nov. 12, 1976

[51] Int. Cl.² .............................................. F16F 1/37
[52] U.S. Cl. .................................. 267/145; 267/153; 264/46.5
[58] Field of Search ............... 267/141, 142, 143, 145, 267/151, 152, 153; 264/46.4, 46.5, 46.6; 428/315

[56] References Cited

U.S. PATENT DOCUMENTS

| | | | |
|---|---|---|---|
| 2,892,489 | 6/1959 | Hurley | 267/145 |
| 3,432,583 | 3/1969 | Robertson | 264/46.4 |
| 3,520,769 | 7/1970 | Baker | 264/46.4 |
| 3,553,749 | 1/1971 | Majeske | 267/153 |
| 3,607,601 | 9/1971 | Milam et al. | 264/46.4 |
| 3,840,627 | 10/1974 | Rhodes | 264/46.4 |
| 3,929,948 | 12/1975 | Welch et al. | 264/46.4 |

FOREIGN PATENT DOCUMENTS 1293628  4/1962  France .................................. 264/46.4

*Primary Examiner*—Edward R. Kazenske
*Attorney, Agent, or Firm*—Gravely, Lieder & Woodruff

[57] ABSTRACT

A cushion includes a core, a shell surrounding the core, and a flexible membrane interposed between the core and the shell. Both the core and shell are formed from foam material, with the foam material of the core being substantially stiffer upon initial loading than the foam material of the shell. The membrane is also formed from foam material, but is quite a bit denser than the foam material of either the core or shell. The overall effect of the membrane and the different load bearing characteristics for the two foam materials is a cushion which is quite soft to touch, but nevertheless capable of supporting heavy loading without excessive deflection. The cushion is produced by placing the core, which is cut from slab foam, into a mold cavity and then molding the shell about it. The amount of liquid reaction material introduced into the cavity, that is the amount of precursors for the foam of the shell, is in excess of the amount necessary to fill the cavity, and the overfill densifies at the surface of the core, forming the membrane.

12 Claims, 4 Drawing Figures

RESILIENT COMPOSITE FOAM CUSHION

BACKGROUND OF THE INVENTION

This invention relates in general to cushions and more particularly to cushions formed from foam material.

From the standpoint of comfort, it is desirable to have the seating cushions of automobiles as soft as possible. However, seat cushions which are too soft sag excessively when occupied by heavy individuals. In other words, a heavy individual will sink quite deeply into such a seat cushion, while a light individual will sink to a considerably lesser extent. In either case, the occupant does not acquire the most desirable view through the vehicle's windows. This problem is most acute at the driver's seat, for automobile designers in configuring passenger compartments seek to maintain a specific eye level, or H-point as it is often called. Ideally, all occupants of the driver's seat should have the same eye level. While this is impossible to attain, it is nevertheless desirable to approach the goal as closely as possible. Excessively soft seat cushions do not provide the solution, while excessively hard cushions do not afford the necessary comfort.

SUMMARY OF THE INVENTION

One of the principal objects of the present invention is to provide a seat cushion which has the feeling of softness, yet offers sufficient resistance to heavy individuals to prevent them from sinking too deeply. Another object is to provide a seat cushion of the type stated which is comfortable to light and heavy individuals alike. A further object is to provide a seat cushion of the type stated which is simple in construction and easy to manufacture. An additional object is to provide a seat cushion of the type stated which is of a composite construction in that it contains foam of varying density and load bearing characteristics. Still another object is to provide a seat cushion of the type stated which contains a flexible membrane between the foams of varying density and this membrane tends to increase the sag factor of the overall cushion. These and other objects and advantages will become apparent hereinafter.

The present invention is embodied in a cushion including a core formed from foam material, a shell of foam material, and a membrane between the shell and core, with the membrane being a foam material which is denser than the foam material of the core or shell. The invention is also embodied in the process which includes placing the core in a mold cavity, and introducing a liquid reaction mixture into the mold cavity, with the amount of liquid reaction mixture being sufficient to not only create the foam of the shell, but to also densify at the surface of the core and thereby form the membrane. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
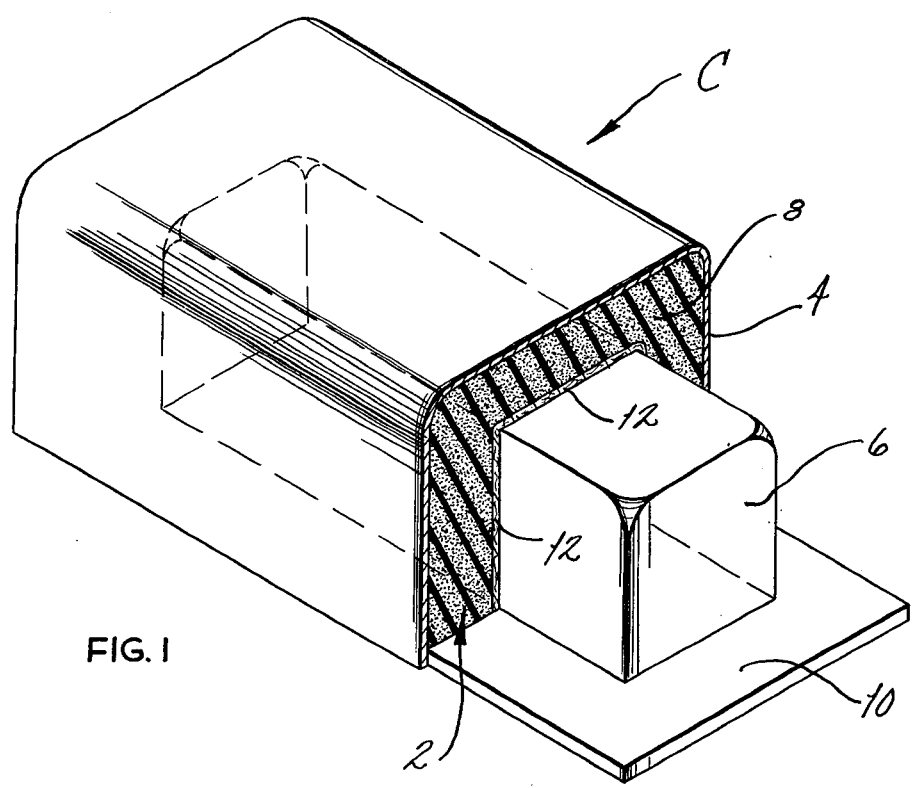
FIG. 1 is a perspective view, partially broken away and in section, of the cushion of the present invention.

Referring now to the drawings (FIG. 1), C designates a seat, mattress, back rest, head rest, or some other cushioning device which includes a composite cushion 2 formed entirely from foam material and covered by a flexible upholstery material 4 such as sheet vinyl or fabric. The composite cushion 2 consists of a core 6 formed from a foam which is relatively hard or stiff at initial loading, and a covering shell 8 which is formed from a foam which is relatively soft at inital loading. The cushion may be mounted on a suitable base 10 such as a piece of plywood or a metal panel.

The sag factor for the composite cushion 2 ranges between 3.0 and 10 or even more, and is greater than the sag factor for the foams of either of its components, that is the core 6 or the covering shell 8. In this regard, the sag factor is a recognized measure of a foam's resiliency or load bearing characteristics and is determined by an instrument called an indentation load deflector. That instrument is nothing more than a flat circular plate having an area of 50 in$^2$ and means for urging the plate into foam with a known force. The instrument is commonly used in the foam producing industry to evaluate and compare the load-bearing characteristics of various foams. In particular, the sag factor is the ratio of forces required to achieve a 25% and a 65% compression of the foam. For example, if 25 lbs. causes the circular plate to move 2.5 inches into a foam which possessed an initial thickness of 10 inches, leaving the compressed foam with a thickness of 7.5 inches, and 50 lbs. causes the circular plate to move 6.5 inches, leaving the compressed foam with a thickness of 3.5 inches, then the sag factor is 50 lbs./25 lbs. or 2. Thus, foams having large sag factors are generally speaking more capable of withstanding loading without excessive deflection.

Figure 3:
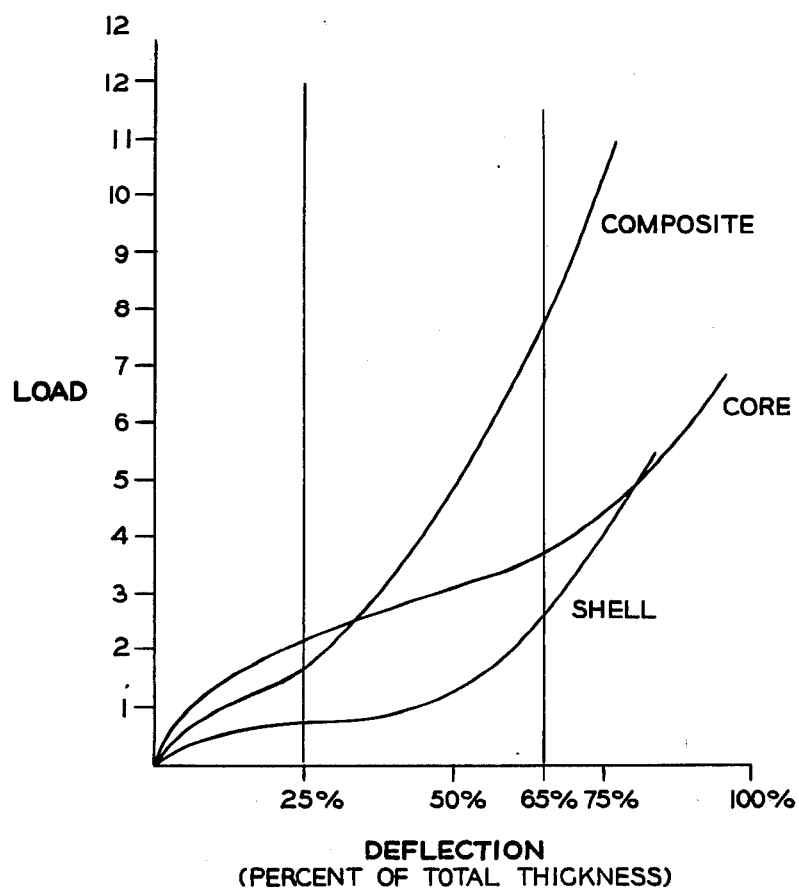
FIG. 3 is a graph showing the load bearing characteristics of the core, the shell, and the composite cushion.

The core 6 is preferably derived from slab foam, that is foam which is cut from a large bun cast in a continuous bun mold of the type described in U.S. Pat. No. 3,906,068. It should have a density of between 1.5 and 3 lbs./ft.$^2$ and a sag factor ranging between 1.6 and 2.0. It should further be compounded such that relatively high resistance to loading is offered at initial deflection below about 25% compression. In other words, the restoring force exerted by the slab foam is not directly proportional to deflection, but on the contrary is such that a unit increment increase of force at light loads will cause less of a deflection than a comparable unit increase in load at moderate loads (FIG. 3). Thus the core 6 is quite stiff at light loads, but not so much at moderate loads. The shape of the core 6 is not too critical and therefore it need not be cut from the slab with any precision. The core 6 may be cast in the desired shape in a mold, instead of being cut from a slab. Preferably, the foam of the core 6 is of the open cell variety.

The covering shell 8 is preferably formed about the core in a mold and is a high resiliency foam having a sag factor ranging between 2.3 and 3.5. Its density ranges between 2.0 and 3.5 lbs./ft.$^3$. Like the slab foam of the core 6, the molded high resiliency foam of the shell 8 does not exert a restoring force which is directly proportional to the deflection. However, the restoring force exhibits a greater rate of increase at 65% deflection than at 25% deflection (FIG. 3). In other words, a unit increase in force applied to the foam of the shell 8 at light loads will cause a greater deflection than an equivalent increase in force at high loading.

The shell 8 is diffused into the core 6 at a membrane 12 (FIG. 1), so in effect the membrane 12 is between the core 6 and shell 8. The membrane 12 is actually a densified layer of the foam material from which the shell 8 is formed. Its density exceeds both that of the core 6 and the shell 8, ranging between 6 and 20 lbs./ft.$^3$. The thickness of the membrane 12 ranges between 1/32 and ¼ inches. The membrane 12 is an integral part of the shell 8 and is bonded to the core 6. That bond relies on both adhesion of foam for the shell 8 to the foam for the core 6 and diffusion of the former into the latter.

Figure 2:
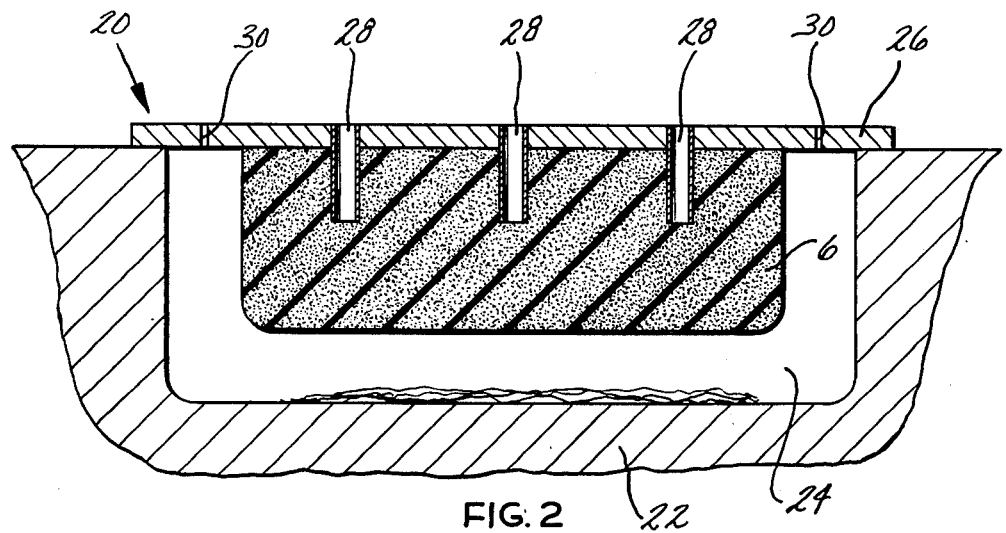
FIG. 2 is a sectional view of the mold in which the cushion is formed, the mold having the pre-cut core and the liquid reaction mixture in it.

To manufacture the composite cushion 2, the core 6 is first cut from suitable slab foam in the desired configuration. Next the properly shaped core 6 is inserted into a mold 20 (FIG. 2) having a base 22 provided with a mold cavity 24 and a lid 26 which covers the mold cavity 24. The mold cavity 24 possesses the configuration of the external surface on the shell 8, and the core 6 is suspended in it by pin-like holders 28 which extend into the core 6 from the lid 26. Preferably the holders 28 are hollow and have their hollow interiors exposed outwardly so as to vent the cavity 24 when the lid 26 is in place. The lid 26 may also be provided with additional vent holes 30.

Once the core 6 is secured to the holders 28, the precursors for the high resiliency foam material of the shell 8 are introduced into mold cavity 24 of the base 22 where they mix together, forming a liquid reaction mixture. After a few seconds, the reaction mixture begins to cream, that is it thickens, and then it expands into a foam which rises in the mold cavity 24 until it completely fills the remainder of the cavity 24. The air which is displaced by the rising foam escapes through the hollow interiors of the holders 28 and through the vent apertures 30. In this regard, the foam material of the core 6 is of the open cell variety so that the displaced air will pass through it and into the hollow interiors of the holders 28.

The rising foam is tacky in its own right and when it comes against the surface of the core 6, it adheres to that surface. The foam also diffuses into the interstices of the foam material for the core 6. As a result, the shell 8 is both adhesively and diffusion bonded to the core 6.

The amount of liquid reaction mixture introduced into the mold cavity is somewhat in excess of the amount necessary to completely fill the remainder of the cavity with foam material. As a result, the liquid reaction mixture continues to produce foam after the rising foam has reached and completely covered the exposed surfaces of the core 6, and the foam at the surface of the core 6 densifies, creating the membrane 12. The thickness of the membrane 12 is dependent on the extent of the overfill and should range between 1/32 and ¼ inches. Since the air which formally occupied the mold cavity 24 escapes through the core 6 as well as through the vent holes 30, it does not become entrapped at the surface of the core 6. This results in the membrane 12 having quite uniform thickness.

Thereafter the foam material of the shell 8 is cured and the unified shell 8 and core 6 are removed from the mold cavity 24 and detached from the holders 28, thus providing the composite cushion 2. Once freed of the mold 20, the composite cushion 2 is fitted with the upholstery material 4 and may be mounted on a suitable base 10.

Since the highly resilient foam of the shell 8 is presented outwardly, the composite cushion 2 feels quite soft. In this regard, it will be recalled that the foam material of the shell 8 develops its rigidity at high deflections, and at relatively low deflections offers little resistance. However, when an individual sits on the cushion, the shell 8 is deflected to the extent that it offers substantially greater resistance. Furthermore, the core 6 is also deflected to a lesser degree. Indeed, the core 6 is deflected into the range where rate of change of force for unit increase in deflection is greatest so that the initial stiffness of the core is used advantageously. Aside from using the load-bearing characteristics of the core 6 and shell 8 to their maximum advantage, the membrane 12 between the core 6 and shell 8 imparts further rigidity to the overall composite cushion 2 under heavy loading, since it must likewise be deflected and when so deflected its peripheral margin is drawn inwardly, requiring substantial force. In other words, the membrane 12 resists loading much in the same manner as a trampoline.

Figure 4:
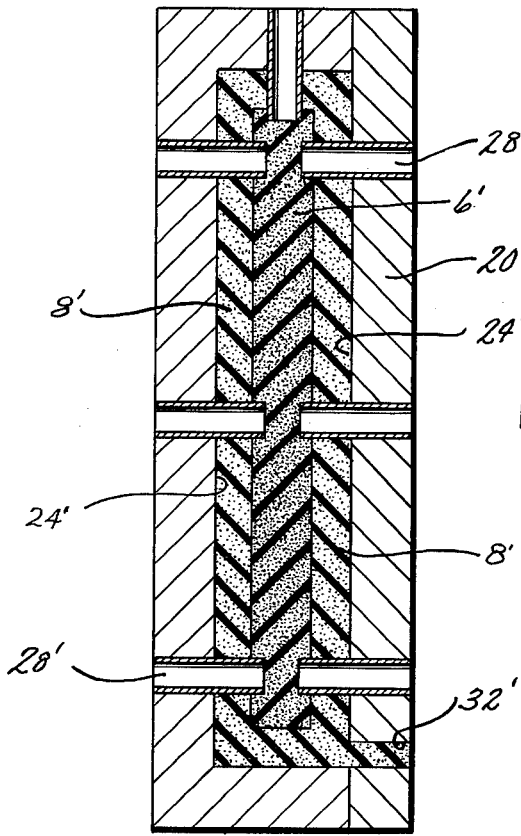
FIG. 4 is a sectional view of a modified cushion and the mold in which it is produced.

It is possible to form a reversible cushion having its core 6' completely encapsulated in its shell 8'. In that case the core 6' is formed in a usual manner and is then placed in the mold cavity 24' of a mold 20' (FIG. 4). The mold cavity 24' is oriented with its longitudinal axis presented vertically and the mold 20' has a fill hole 32 which opens into the cavity 24' at the bottom thereof. Projecting into the mold cavity 24' from the side and top walls of the mold 20' are holding pins 28' which engage the core 6' and maintain it in a fixed position spaced from all the walls of the mold 20'. Thus, a void exists in the mold cavity 24' along each face of the core 6'. The holding pins 28' are hollow and open outwardly of the mold 20' so that the mold cavity 24' is vented through the hollow holding pins 28'.

The shell 8' is formed by introducing a suitable liquid reaction mixture through the fill hole 32 and allowing it to expand into a foam within the unoccupied portion of the mold cavity 24'. Consequently the foam develops along each side of the core 6', completely encapsulating the core 6'. The amount of liquid reaction mixture introduced exceeds the amount necessary to completely fill the void within the mold cavity 24', and as a result the finished cushion contains a membrane 12' along the surface of its core 6'.

This invention is intended to cover all changes and modifications of the example of the invention herein chosen for purposes of the disclosure which do not constitute departures from the spirit and scope of the invention.

What is claimed is:

1. A composite cushion designed to comfortably support or serve as a rest for the human body or a part thereof, said cushion comprising: a core formed from a resilient foam material that is capable of regaining its original shape after a substantial deflection; a shell extended over the core, the shell being presented outwardly toward a load that is applied to the cushion and having substantial thickness beyond the core, the shell being formed from a resilient foam material that is likewise capable of retaining its original shape after a substantial deflection, but has a greater sag factor than the foam material of the core; and a thin flexible membrane between the core and shell and being formed integral with the shell, but having a density greater than the foam material of either the core or shell, the membrane being diffused into the interstices of the foam material for the core so as to be bonded firmly to the core, the membrane further deflecting upon the application of a load that deforms the shell toward the core and in deflecting serving to resist the load, whereby the membrane cooperates with the foam materials of the shell and core in supporting the load applied to the cushion and imparts rigidity to the composite cushion, the cushion having a sag factor greater than the sag factor for the foam material of either the core or shell, with the sag factor of the cushion being at least about 3.

2. A cushion according to claim 1 wherein as to the foam material for the core, a given increment of increase in the load per unit area effects a larger deflection of the foam material at loads of higher magnitude than at loads of a lower magnitude.

3. A cushion according to claim 1 wherein as to the foam material for the shell, a given increment of increase to the load per unit area effects a smaller deflection of the foam material at loads of higher magnitude than at loads of lower magnitude.

4. A cushion according to claim 1 wherein as to the foam material for the core, a given increment of increase in the load per unit area effects a larger deflection of the foam material at loads of higher magnitude than loads of lower magnitude, and as to the foam material for the shell, a given increment of increase in the load per unit area effects a smaller deflection of the foam material at loads of higher magnitude than at loads of lower magnitude.

5. A cushion according to claim 1 wherein the sag factor for the foam material of the core is between about 1.6 and 2.0, the sag factor for the foam material of the shell is between about 2.3 and 3.5, and the sag factor for the cushion is at least 3.5.

6. A composite cushion designed to comfortably support or serve as a rest for the human body or a part thereof, said cushion comprising: a first foam material having sufficient resiliency to regain its original shape after a substantial deflection; a second foam material adjacent to the first foam material and also having sufficient resiliency to regain its original shape after a substantial deflection, with the sag factor of the second foam material being different from the sag factor of the first foam material; and a thin resilient membrane interposed between the first and second foam materials and being extended at least generally normal to the direction in which loads are normally applied to the cushion, the membrane having a density greater than either of the foam materials, the membrane being integral with and formed from the same substance as the second foam material and being formed by the diffusion of the second foam material into interstices of the first foam material so as to be joined firmly to both the first and second foam materials, the membrane being capable of deflecting under loads applied to the cushion so as to conform to deformations of the first and second foam materials and upon deformation further serving to resist loading so as to impart rigidity to the cushion in excess of that which the cushion would possess if the second foam material were bonded directly to the first foam material, the cushion having a sag factor that is greater than the sag factors for both the first and the second foam materials.

7. A cushion according to claim 6 wherein the membrane adheres the second foam material to the first foam material.

8. A cushion according to claim 6 wherein as to the first foam material, a given increment of increase in the load per unit area effects a larger deflection of the first foam material at loads of higher magnitude than loads of lower magnitude, and as to the second foam material, a given increment of increase in the load per unit area effects a smaller deflection of the second foam material at loads of higher magnitude than at loads of lower magnitude.

9. A cushion according to claim 6 wherein the sag factor for the first foam material is between about 1.6 and 2.0, the sag factor for the second foam material is between about 2.3 and 3.5, and the sag factor for the composite cushion is at least 3.5.

10. A cushion according to claim 9 wherein the membrane is between about 1/32 and ¼ inches thick.

11. A cushion according to claim 9 wherein the density of the first foam material ranges between about 1.5 and 3 lbs./ft$^3$; the density of the second foam material ranges between about 2.0 and 3.5 lbs./ft.$^3$; and the density of the membrane ranges between about 6 and 20 lbs./ft.$^3$.

12. A cushion according to claim 6 wherein the first foam material has six major surface areas and the membrane and second foam material cover at least five of those surface areas.

* * * * *